US005553436A

United States Patent [19]
Kish et al.

[11] Patent Number: 5,553,436
[45] Date of Patent: Sep. 10, 1996

[54] SCREEN FOR ANCHORING A FASTENER TO A HOLLOW BLOCK WITH AN ADHESIVE

[75] Inventors: Frederick A. Kish, Wheeling; Michael A. Rancich, Mundelein; Richard J. Ernst, Palatine; Mark S. Timmerman, Elgin, all of Ill.

[73] Assignee: Illinois Tool Works Inc., Glenview, Ill.

[21] Appl. No.: 280,088

[22] Filed: Sep. 16, 1994

[51] Int. Cl.⁶ ........................................ E04C 5/00
[52] U.S. Cl. ........................ 52/704; 52/698; 52/705
[58] Field of Search .................... 52/704, 705, 698; 411/408, 429, 372

[56] References Cited

U.S. PATENT DOCUMENTS

| | | | |
|---|---|---|---|
| 2,849,866 | 9/1958 | Flygare et al. | 61/45 |
| 3,308,585 | 3/1967 | Fischer | 52/704 |
| 3,703,790 | 11/1972 | Mattes et al. | 52/98 |
| 3,877,235 | 4/1975 | Hill | 61/45 |
| 3,901,039 | 8/1975 | Lundkvist | 61/45 |
| 4,063,582 | 12/1977 | Fischer | 151/41.7 |
| 4,139,323 | 2/1979 | Brandstetter | 405/260 |
| 4,224,971 | 9/1980 | Muller et al. | 151/41.7 |
| 4,313,696 | 2/1982 | Horten | 405/259 |
| 4,314,778 | 2/1982 | Cantrel | 405/259 |
| 4,430,024 | 2/1984 | Ciavatta | 405/261 |
| 4,490,074 | 12/1984 | Chaiko | 405/259 |
| 4,528,792 | 7/1985 | Cross et al. | 52/704 |
| 4,620,406 | 11/1986 | Hugel et al. | 52/704 |
| 4,696,606 | 9/1987 | Herron | 405/259 |
| 4,773,794 | 9/1988 | Harke | 405/260 |
| 4,787,186 | 11/1988 | Irmscher et al. | 52/309.3 |
| 4,790,114 | 12/1988 | Falco | 52/707 |
| 4,930,284 | 6/1990 | Falco | 52/704 |
| 4,968,185 | 11/1990 | Leibhard et al. | 405/260 |
| 5,104,266 | 4/1992 | Daryoush et al. | 405/259.5 |
| 5,263,804 | 11/1993 | Ernst et al. | 411/82 |

*Primary Examiner*—Carl D. Friedman
*Assistant Examiner*—W. Glenn Edwards
*Attorney, Agent, or Firm*—Schwartz & Weinrieb

[57] ABSTRACT

A screen for anchoring a fastener to a hollow block or brick wall which includes an elongate tubular plastic screen member having first and second opposite ends and a uniform diameter along its length. The first end is formed substantially into a frusto-conical shape that includes at least a portion thereof where the mesh of the screen is closed off. At least one reinforcement member is formed along the length of the elongate screen member that enables the elongate screen member to be inserted within a first aperture formed in a first wall of a hollow block and maintain the desired stiffness of the tubular screen member so that it can extend across the interior of the hollow block for blind insertion into a second aperture formed in a second opposite wall of the hollow block.

25 Claims, 1 Drawing Sheet

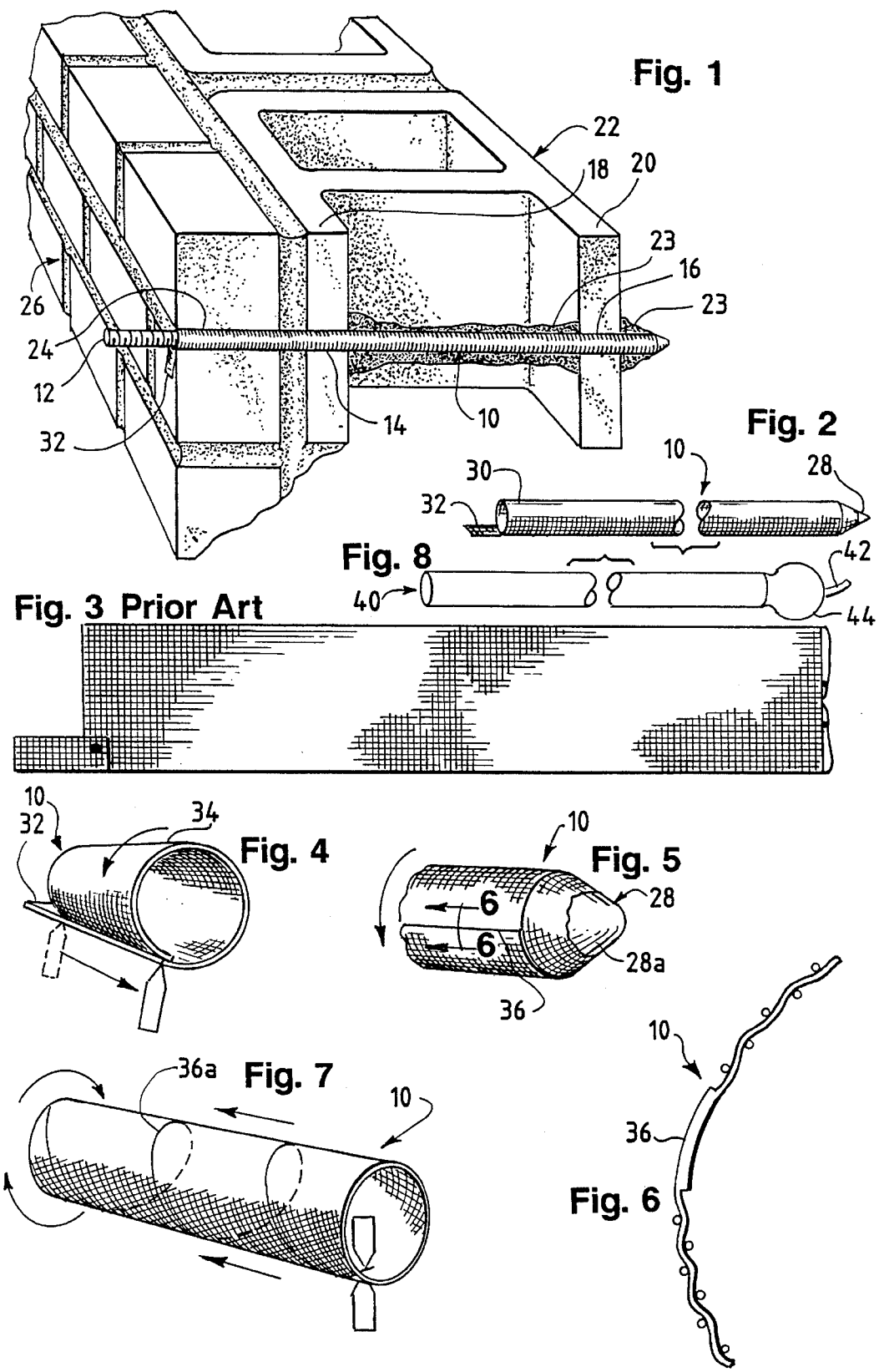

SCREEN FOR ANCHORING A FASTENER TO A HOLLOW BLOCK WITH AN ADHESIVE

FIELD OF THE INVENTION

This invention relates generally to methods for securing a fastener to a hollow block or brick wall, and more particularly, to a plastic screen which is filled with an adhesive and inserted within aligned apertures formed in the hollow block, or in accordance with a brick or combination of common building practices. The fastener, such as a threaded bolt, rebar or smooth dowel rod, is inserted within the screen and extrudes the adhesive out of the mesh of the screen to bond with the hollow block and secure the bolt thereto upon setting.

BACKGROUND OF THE INVENTION

In order to securely attach a threaded rod, bolt, rebar or other fastener to a masonry wall, typically made of brick or hollow block, and provide dosage control for an adhesive, a metal screen illustrated in FIG. 3 is typically utilized. The screen can also be used for brick pinning and with unreinforced masonry walls.

To install the fastener and screen, a pair of aligned apertures are drilled through the opposite surfaces of the hollow block. The metal screen is then filled with an adhesive and inserted within both apertures and across the interior of the hollow block.

The threaded rod or bolt is then inserted within the screen so as to extrude the adhesive through the screen mesh with a "mushroom" effect to bond with the surfaces of the block. The screen is typically made of metal mesh and is either plated with zinc or made of stainless steel to reduce corrosion of the metal.

To form the distal, insertion end of such a metal screen, portions of the mesh are tucked, folded over and spot welded in place. To assist in gripping the metal screen, a separate metal mesh tab is spot welded to the proximal end opposite the distal end.

Such metal screens, however, are difficult and expensive to make and are messy to fill and install. Additionally, despite measures to prevent corrosion, such metal screens still tend to corrode and/or react with the adhesive over time and discolor the front of the wall over time. Corrosion of the metal screen tends to expand the screen and crack the adhesive thereby reducing the pull out strength of the resulting anchor.

It therefore would be desirable to provide a screen for anchoring a fastener to a hollow block, brick wall or the like with an adhesive that includes an elongate tubular screen member formed from plastic which is rigid enough to be inserted within the apertures of the hollow masonry and does not corrode or reduce the effectiveness of the anchor over time while significantly reducing the cost of the screen and providing an and easy clean installation.

SUMMARY OF THE INVENTION

The invention provides a screen for anchoring a fastener to a hollow block or brick wall. The screen includes an elongate tubular plastic screen member having first and second opposite ends and a uniform diameter along its length. The first end is preferably formed substantially into a frusto-conical shape that has at least a portion thereof where the mesh of the screen is closed off.

At least one reinforcement member is formed along the length of the elongate screen member. The reinforcement member enables the elongate screen member to be inserted within a first aperture formed in a first wall of the hollow block and maintain the desired stiffness of the elongate screen member so that it can extend across the interior of the hollow block for blind insertion into a second aperture formed in a second opposite wall of the hollow block. Alternatively, the screen can be utilized in a solid wall or in just the face of a hollow block.

Additionally, a thin plastic film of shrink wrap or heat sealed material can be provided around the exterior of the screen to reduce mess during filling by a user and provide the correct amount of fill for the tubular screen for a particular application. The plastic film is removed with a pull tab by a user prior to insertion of the screen within the aperture.

BRIEF DESCRIPTION OF THE DRAWINGS

Various objects, features, and attendant advantages of the present invention will be more fully appreciated from the following detailed description when considered in connection with the accompanying drawings in which like reference characters designate like or corresponding parts throughout the several views, and wherein;

FIG. 1 is a perspective view of the plastic screen of the invention illustrated as extending across the interior of a hollow block with adhesive and a threaded bolt secured therein;

FIG. 2 is a perspective view, in partial section, of the plastic screen of FIG. 1;

FIG. 3 is an enlarged side elevational view of a prior art metal screen;

FIG. 4 is a perspective view of a plastic screen of the invention being rolled and secured into the desired shape;

FIG. 5 is an enlarged perspective view of the plastic screen of the invention illustrating the frustoconical insertion end thereof;

FIG. 6 is a cross-sectional view of the plastic screen taken along line 6—6 of FIG. 5 in the direction indicated;

FIG. 7 is a perspective view of another embodiment for rolling and securing the plastic screen of the present invention; and FIG. 8 is a perspective view of the thin plastic film that provides correct filling of adhesive in the screen and allows grabbing of the tubular screen prior to installation of the screen without a mess.

DESCRIPTION OF THE PREFERRED EMBODIMENTS

Referring to FIG. 1, a plastic screen of the invention is designated generally by the reference numeral 10. The screen is 10 is preferably utilized for securing a threaded bolt 12 within first and second apertures 14 and 16 formed in opposed first and second walls 18 and 20 of a hollow block, brick or other type of building structure 22 with an adhesive 23.

If desired, the screen 10 also can also be formed long enough to extend through an aperture 24 of a brick facing layer 26. It is to be noted, however, that the brick layer 26 can be removed or replaced with any other member so long as the screen 10 functions as described herein.

The screen 10 is preferably formed from a synthetic fabric or mesh netting, such as nylon polyester, polypropylene or any similar material. Alternatively, the screen 10 can be formed from a perforated plastic sheet and may be made from polyester, polyethylene or polypropylene. Preferably, the screen 10 has a mesh opening of 0.0280 inches with 45% open area, a thread diameter of 350 microns and a fabric thickness of 700 microns, but can vary so long as it functions as described herein.

The screen 10 has a predetermined diameter selected to cooperate with the diameter of the threaded bolt 12 and the apertures 14 and 16. The length of the screen 10 is selected so that at least a portion of the screen 10 extends outward from the second rear wall 20 of the block 22 where the length can vary depending on the size of the block 22 and whether a solid wall or face is utilized.

As FIG. 2 illustrates, the screen 10 includes a first closed distal end 28 and a second opposite open proximal end 30. The first end 28 is preferably substantially frusto-conical in shape so as to assist in insertion of the screen within the masonry apertures; and prevents end loading when contacting the edge of the aperture 24. Alternatively, the first end 28 can be bullet or hemisphere shaped, To assist in gripping the screen 10 as adhesive is provided therein, the second end 30 includes an integrally formed plastic mesh tab 32. Alternatively, the tab 32 can be a separate member attached to the screen 10 or can be eliminated, depending on the application, particularly where flush installation is desired.

Briefly, as FIG. 4 illustrates, in the preferred method of making the screen 10, a strip 34 of screen having a predetermined length and width is cut from stock with the tab 32 extending therefrom. The strip 34 is rolled about its longitudinal axis and secured to itself at one or more locations, or along the entire length of the strip 34, by an adhesive, hot melt, heat or ultrasonic welding. Alternatively, the screen 10 can be manufactured in a continuous operation.

As FIG. 6 illustrates, the welding or joining substantially provides a solid weld line 36 of melted material down the entire length of the screen 10. The solid weld line 36 improves the rigidity of the screen 10 to prevent buckling and assist in locating the screen 10 within the blind aperture 16 in the rear wall 20 of the block 22. If desired, additional weld lines (not illustrated) can be provided to further increase the rigidity of the screen 10.

As FIG. 5 illustrates, if the first end 28 is to be closed, the first end 28 is heated and formed within a die (not illustrated) to provide the frusto-conical, bullet or hemisphere shape and the closed mesh portion 28a as illustrated which may not close the entire first end 28. The screen 10 is then ready for use.

Alternatively, the first end 28 can remain open or partially closed. Additionally, a separate plug (not illustrated) can be utilized to close off the first end 28.

The simple method of manufacturing the screen 10 provides fast, low cost assembly with substantially smooth surfaces to eliminate edge loading during installation. The frusto-conical, bullet or hemisphere shape of the first end 28 provides ease of entry and trouble free insertion into the apertures 14 and 16.

FIG. 7 illustrates an alternate method of manufacturing the screen 10. In this embodiment, the screen 10 is helically wound and the adjacent sections of the screen are; welded or joined to provide a helical weld line 36a thereon. The helical weld line 36a provides the necessary rigidity to the screen 10 while enabling a strip 34 of the same width to be used to provide different screens 10 of different diameters;

More particularly, the screen 10 illustrated in FIG. 7 has a diameter formed by winding the strip 34 at a particular pitch and providing the helical weld line 36a, such as by an adhesive, hot melt, or heat or ultrasonic welding. To change the diameter, the strip 34 is merely wound with a different pitch. Thus, one strip 34 can be utilized to provide screens 10 having a variety of diameters. Helically winding the screen 10 also can also be accomplished in a continuous operation.

To install the screen 10 and bolt 12 to the hollow block 22, the apertures 14 and 16 are first drilled into the first and second walls 18 and 20 of the hollow block 22. If the brick facing layer 26 is included, the aperture 24 is also drilled.

The screen 10 is then held by the tab 32 and filled with adhesive 23. The conical end 28 of the screen 10 with the adhesive 23 therein is inserted through the apertures 26, 14 and 16 to the position illustrated in FIG. 1.

Alternatively, the screen 10 can be inserted within the wall and then filled with adhesive. The screen 10 can also be used with a single cavity within a wall.

The bolt 12 is inserted within the screen 10 and adhesive 23 is extruded through the mesh of the screen 12. The adhesive 23 tends to accumulate about the surfaces of the first wall 18 and second wall 20 for adhesion thereto and the closed conical end portion 28a prevents adhesive 23 from flowing out of the end of the screen 10.

Use of the plastic screen 10 provides a low cost method of manufacturing the screen 10 and securing the bolt 12 within the hollow block 22. The plastic screen 10 also reduces corrosion and is easier to locate in the apertures 14 and 16 due to the stiff weld line 36 and the conical end 28.

Additionally, flow control of adhesive 23 along the length of the screen 10 can be provided by providing a label (not illustrated), which can be shrink wrapped, or by welding closed a portion of the plastic mesh at one or more desired locations (not illustrated). The label can also provide identification and instructions if desired.

Additionally, FIG. 8 discloses a thin piece of plastic film or extruded member 40, that could be used as a prophylactic and includes a pull tab 42. The film 40 is shrink wrapped or heat sealed together into the shape of a tube and is positioned about the screen 10 prior to insertion of the screen 10 into the aperture 24 to keep a user's hands free of adhesive during filling of the screen 10. Alternatively, the film member 40 can also be made of paper or a laminate material.

The pull tab 42 assists in removal of the film 40 from the screen 10 and prevents insertion of the film 40 within the aperture 24 so that the film 40 is removed prior to installation of the screen 10. Additionally, a closed end 44 of the film 40 can be enlarged to assist in preventing insertion of the film 40 within the aperture 24.

Modifications and variations of the present invention are possible in light of the above teachings. It is to be understood that within the scope of the claims the invention may be practiced other than specifically described.

We claim:

1. A screen assembly for anchoring a fastener within a wall structure having first and second apertures defined therein, comprising:

a screen member, comprising a plastic material for resisting corrosion, having an elongated tubular portion defined about a longitudinal axis, first forward and second rearward opposite ends, as considered in a direction of insertion of said screen member within said wall structure, and a substantially-uniform diameter along its length, said second rearward end of said screen member being open so as to permit adhesive to be deposited into said screen member, and said first forward end of said screen member being pre-formed so as to have a substantially conical configuration having a substantially pointed tip portion, disposed along said longitudinal axis, for facilitating insertion of said screen member into and through said first and second apertures of said wall structure and being pre-formed so as to be closed such that when a fastener is inserted into said screen member, said adhesive, disposed within said screen member, will be prevented from being axially discharged from said substantially conical first forward end of said screen member and will be forcedly discharged radially through mesh portions of said elongated tubular portion of said screen member so as to fixedly bond said screen member and said fastener to said wall structure; and at least one reinforcement portion provided along substantially the entire length of said elongated tubular portion of said screen member so as to impart a sufficient amount of rigidity to said screen member such that said elongated tubular portion of said screen member is able to be inserted within said first aperture formed within said wall structure and maintain said amount of rigidity so as to permit insertion of said screen member into said second aperture formed within said wall structure.

2. The screen assembly as defined in claim 1 including a tab integrally formed with said second opposite end of said elongate screen member.

3. The screen assembly as defined in claim 1 wherein said reinforcement member is formed as a helical seam along the length of the elongate screen member.

4. The screen assembly as defined in claim 1 wherein said closed portion of said conical first end of said elongate member is closed off by plastic which is provided by melting and forming said first end into said substantially conical shape.

5. The screen assembly as defined in claim 1 including at least one portion along the length of said elongate member which is blocked to prevent adhesive from being emitted at that location.

6. A screen assembly for anchoring a fastener within a wall structure having first and second apertures defined therein, comprising:

a screen member, comprising a plastic material for resisting corrosion, having an elongated tubular portion, first and second opposite ends, and a substantially uniform diameter along its length, said second end of said screen member being open so as to permit adhesive to be deposited into said screen member, and said first end of said screen member having a substantially conical configuration for facilitating insertion of said screen member into and through said first and second apertures of said wall structure, and being closed such that when a fastener is inserted into said screen member, said adhesive, disposed within said screen member, will be prevented from being axially discharged from said substantially conical end of said screen member and will be forcedly discharged radially through mesh portions of said elongated tubular portion of said screen member so as to fixedly bond said screen member and said fastener to said wall structure;

at least one reinforcement portion provided along substantially the entire length of said elongated tubular portion of said screen member so as to impart a sufficient amount of rigidity to said screen member such that said elongated tubular portion of said screen member is able to be inserted within said first aperture of said wall structure and to maintain said amount of rigidity so as to permit insertion of said screen member into said second aperture of said wall structure; and a sleeve member, including a pull tab, disposed about at least a portion of said screen member for enabling proper, easy filling of said screen member with said adhesive, and clean installation of said screen member into and through said first and second apertures of said wall structure after removal of said sleeve member from said screen member.

7. The screen assembly as set forth in claim 6, further comprising:

a tab integrally formed with said second end of said screen member for handling said screen member during insertion of said screen member within said wall structure.

8. The screen assembly as set forth in claim 6, wherein:

said reinforcement portion comprises a welded seam region.

9. The screen assembly as set forth in claim 8, wherein:

said welded seam region extends linearly throughout substantially the entire length of said screen member.

10. The screen assembly as set forth in claim 8, wherein:

said welded seam region extends helically about a longitudinal axis of said screen member.

11. The screen assembly as set forth in claim 1, wherein:

said plastic material is selected from the group comprising nylon, polyester, polypropylene, and polyethylene.

12. The screen assembly as set forth in claim 6, wherein:

said plastic material is selected from the group comprising nylon, polyester, polypropylene, and polyethylene.

13. A screen assembly for anchoring a fastener within a wall structure having first and second apertures defined therein, comprising:

a fastener to be anchored within a wall structure;

a screen member, comprising a plastic material for resisting corrosion, having an elongated tubular portion defined about a longitudinal axis, first forward and second rearward opposite ends, as considered in a direction of insertion of said screen member within said wall structure, and a substantially uniform diameter along its length, said second rearward end of said screen member being open so as to permit adhesive to be deposited into said screen member, and said first forward end of said screen member being pre-formed so as to have a substantially pointed tip portion, disposed along said longitudinal axis, for facilitating insertion of said screen member into and through said first and second apertures of said wall structure and being pre-formed so as to be closed such that when said fastener is inserted into said screen member, said adhesive, disposed within said screen member, will be prevented from being axially discharged from said substantially conical first forward end of said screen member and will be forcedly discharged radially through mesh portions of said elongated tubular portion of said screen member so as to fixedly bond said screen member and said fastener to said wall structure; and at least one reinforcement portion provided along substantially the entire length of said elongated tubular portion of said screen member so as to impart a sufficient amount of rigidity to said screen member such that said elongated tubular portion of said screen member is able to be inserted within said first aperture of said wall structure and be able to maintain said amount of rigidity so as to permit insertion of said screen member into said second aperture of said wall structure.

14. The screen assembly as set forth in claim 13, wherein: said fastener comprises a threaded bolt.

15. The screen assembly as set forth in claim 13, wherein: said reinforcement portion comprises a welded seam region.

16. The screen assembly as set forth in claim 15, wherein said welded seam region extends linearly throughout substantially the entire length of said screen member.

17. The screen assembly as set forth in claim 15, wherein: said welded seam region extends helically about said longitudinal axis of said screen member.

18. The screen assembly as set forth in claim 13, further comprising:
a tab integrally formed with said second end of said screen member for facilitating handling of said screen member during deposition of said adhesive into said screen member.

19. The screen assembly as set forth in claim 13, wherein: said plastic material is selected from the group comprising nylon, polyester, polypropylene, and polyethylene.

20. A screen assembly for anchoring a fastener within a hollow block structure having first and second apertures respectively defined within first and second wall members longitudinally spaced apart as considered in a direction of insertion of said screen member within said hollow block structure, comprising:
a screen member, comprising a plastic material for resisting corrosion, having an elongated tubular portion defined about a longitudinal axis, first forward and second rearward opposite ends, as considered in said direction of insertion of said screen member within said hollow block structure, and a substantially uniform diameter along its length; said second rearward end of said screen member being open so as to permit adhesive to be deposited into said screen member; and said first forward end of said screen member being pre-formed so as to have a substantially conical configuration having a substantially pointed tip portion, disposed along said longitudinal axis, for facilitating insertion of said screen member into and through said first aperture defined within said first wall member of said hollow block structure, for further facilitating blind insertion of said screen member into and through said second aperture defined within said second wall member of said hollow block structure, and being pre-formed so as to be closed such that when a fastener is inserted into said screen member, said adhesive, disposed within said screen member, will be prevented from being axially discharged from said substantially conical first forward end of said screen member and will be forcedly discharged radially through mesh portions of said elongated tubular portion of said screen member so as to fixedly bond said screen member and said fastener to said wall structure; and at least one reinforcement portion provided along substantially the entire length of said elongated tubular portion of said screen member so as to impart a sufficient amount of rigidity to said screen member such that said elongated tubular portion of said screen member is able to be inserted within said first aperture of said first wall member of said hollow block structure, and is able to maintain said rigidity so as to permit said screen member to extend across a hollow portion of said hollow block structure defined between said first and second wall members of said hollow block structure and to be blindly inserted within said second aperture of said second wall member of said hollow block structure.

21. The screen assembly as set forth in claim 20, further comprising:
a tab integrally formed with said second end of said screen member for facilitating handling of said screen member during deposition of said adhesive into said screen member.

22. The screen assembly as set forth in claim 20, wherein: said reinforcement portion comprises a welded seam region.

23. The screen assembly as set forth in claim 22, wherein: said welded seam region extends linearly throughout substantially the entire length of said screen member.

24. The screen assembly as set forth in claim 22, wherein: said welded seam region extends helically about said longitudinal axis of said screen member.

25. The screen assembly as set forth in claim 20, wherein: said plastic material is selected from the group comprising nylon, polypropylene, polyester, and polyethylene.

* * * * *